United States Patent
Brochot et al.

(10) Patent No.: US 7,582,356 B2
(45) Date of Patent: Sep. 1, 2009

(54) GLAZING PROVIDED WITH STACKED THIN LAYERS WHICH REFLECT INFRARED RAYS AND/OR SOLAR RADIATION

(75) Inventors: Jean-Pierre Brochot, Aubervilliers (FR); Sylvain Belliot, Aubervilliers (FR)

(73) Assignee: Saint-Gobain Glass France, Courbevoie (FR)

( * ) Notice: Subject to any disclaimer, the term of this patent is extended or adjusted under 35 U.S.C. 154(b) by 423 days.

(21) Appl. No.: 10/562,221

(22) PCT Filed: Jun. 25, 2004

(86) PCT No.: PCT/FR2004/001622
§ 371 (c)(1),
(2), (4) Date: Apr. 24, 2006

(87) PCT Pub. No.: WO2005/000761
PCT Pub. Date: Jan. 6, 2005

(65) Prior Publication Data
US 2006/0257670 A1 Nov. 16, 2006

(30) Foreign Application Priority Data
Jun. 26, 2003 (FR) .................. 03 07749

(51) Int. Cl.
*B32B 17/06* (2006.01)
(52) U.S. Cl. ........... 428/432; 428/426; 428/428; 428/433; 428/448; 428/450; 428/472; 428/336; 428/689; 428/698; 428/699; 428/701; 428/702; 428/913
(58) Field of Classification Search ............ None
See application file for complete search history.

(56) References Cited
U.S. PATENT DOCUMENTS
6,042,934 A 3/2000 Guiselin et al.
6,045,896 A * 4/2000 Boire et al. ............ 428/216
6,287,675 B1 9/2001 Guiselin et al.
6,589,658 B1 * 7/2003 Stachowiak ............ 428/432
6,673,427 B2 1/2004 Guiselin et al.
2005/0123772 A1 6/2005 Coustet et al.

FOREIGN PATENT DOCUMENTS
EP 0 506 507 9/1992
EP 0 646 551 4/1995

OTHER PUBLICATIONS
U.S. Appl. No. 10/562,221, filed Dec. 23, 2005, Brochot, et al.
* cited by examiner

*Primary Examiner*—Ling Xu
(74) *Attorney, Agent, or Firm*—Oblon, Spivak, McClelland, Maier & Neustadt, P.C.

(57) ABSTRACT

The invention relates to a glazing assembly comprising at least one transparent substrate, especially made of glass, provided with a thin-film multilayer comprising, in the following order starting from the substrate, at least:
(a) a first dielectric layer comprising a barrier layer acting as a barrier to the diffusion of oxygen and chosen from silicon nitrides;
(b) a lower stabilizing layer made of a metal or metal alloy X;
(c) a functional layer having reflection properties in the infrared and/or in the solar radiation, especially a metal layer;
(d) an upper metal blocking layer made of a metal or metal alloy Y;
(e) a second dielectric layer comprising a barrier layer acting as a barrier to the diffusion of oxygen and chosen from silicon nitrides; and
(f) optionally, a protective oxide layer;
in which multilayer the metal or alloy X of the lower stabilizing layer is different from the metal or alloy Y of the upper blocking layer.

21 Claims, No Drawings

GLAZING PROVIDED WITH STACKED THIN LAYERS WHICH REFLECT INFRARED RAYS AND/OR SOLAR RADIATION

This application is the national stage application of International Application PCT/FR04/001622 (WO 05/000761) filed Jun. 25, 2004, the contents of which is hereby incorporated by reference and this application claims priority to the French Application No. 03/07749 filed Jun. 26, 2003.

The invention relates to transparent substrates, preferably rigid substrates of the glass type, which are provided with thin-film multilayers that include at least one layer of metallic behavior that can act on solar radiation and/or long-wavelength infrared radiation for the purpose of forming glazing assemblies.

The invention relates to multilayers, comprising alternations of silver-based layers and layers made of a transparent dielectric material of the oxide or metal or nitride compound type, allowing the glazing assemblies to have solar-protection or low-emissivity properties (double glazing for buildings, laminated windshields for vehicles, etc.). It relates more particularly to glass substrates that are provided with such multilayers and have to undergo conversion operations involving a heat treatment at 500° C. or higher: these may especially be a toughening treatment, an annealing treatment or a bending treatment.

Rather than deposit the layers on the glass after its heat treatment (which poses problems that increase the manufacturing costs), it was firstly sought to adapt the multilayers so that they are able to undergo such treatments while still maintaining most of their thermal properties. The object was therefore to prevent the functional layers, especially the silver layers, from deteriorating. One solution, disclosed in patent EP-506 507, consists in protecting the silver layers by flanking them with metal layers for protecting the silver layers adjacent the dielectric oxide layers. This therefore is a bendable or toughable multilayer insofar as it is just as effective in reflecting infrared or solar radiation after the bending treatment or toughening treatment as before said treatment. However, oxidation and modification of the layers that have protected the silver layers from the effect of heat, result in the optical properties of the multilayer being substantially modified, especially resulting in an increase in light transmission and a change in the colorimetric response in reflection. Furthermore, this heating also tends to create optical defects, namely pits and/or various small impairments resulting in a significant level of haze (the expression "small impairments" is generally understood to mean defects having a size of less than 5 microns, whereas "pits" are understood to mean defects larger in size than 50 microns, especially between 50 and 100 microns, with the possibility, of course, of also having defects of intermediate size, i.e. between 5 and 50 microns).

Secondly, it was therefore attempted to develop such thin-film multilayers that are capable of preserving both their thermal properties and their optical properties after heat treatment, while still minimizing the appearance of optical defects. The challenge was thus to produce thin-film multilayers of fixed optical/thermal properties, whether or not they are to undergo heat treatments.

A first solution was proposed in patent EP-718 250. It recommends using, on top of the silver-based functional layer or layers, oxygen barrier diffusion layers, especially those based on silicon nitride, and placing the silver layers directly on the subjacent dielectric coating, without interposition of priming layers or protective metal layers. It proposes multilayers of the $Si_3N_4/ZnO/Ag/Nb/ZnO/Si_3N_4$ or $SnO_2/ZnO/Ag/Nb/Si_3N_4$ type. An $Si_3N_4/Nb/Ag/Nb/Si_3N_4$ multilayer is also described in that document.

A second solution was proposed in patent EP-847 965; this is directed more toward multilayers that include two silver layers, and it describes the use both of a barrier layer on top of the silver layers (as previously) and of an absorbent or stabilizing layer that is adjacent said silver layers and allows them to be stabilized.

It describes multilayers of the following type:

$SnO_2/ZnO/Ag/Nb/Si_3N_4/ZnO/Ag/Nb/WO_3$ or ZnO or $SnO_2/Si_3N_4$.

It should be noted in both solutions that there is a metal layer, in this case made of niobium, on the silver layers, preventing the silver layers from coming into contact with an oxidizing or nitriding reactive atmosphere during deposition by reactive sputtering of the ZnO layer or $Si_3N_4$ layer, respectively.

Another publication relating to multilayers containing one or two silver layers, with adjusted optical properties without a major change in the optical behavior in the event of heat treatment is the document WO-02/48065. This describes multilayers in which at least one layer absorbent in the visible is inserted between two dielectric layers, for example of the following type:

$Si_3N_4/ZnO/Ag/ZnO/Si_3N_4/TiN$ or $NbN/Si_3N_4/ZnO/Ag/ZnO/Si_3N_4$ or $Si_3N_4/ZnO/Ag/Ti/ZnO/TiN/Si_3N_4/ZnO/Ag/Ti/ZnO/TiN/Si_3N_4$.

Document WO 01/40131 describes laminated glazing assemblies or insulating glazing units of the low-emissivity type, that are capable of withstanding a heat treatment in such a way that the treated glazing has an appearance similar to or compatible with the untreated glazing: the treated and untreated glazing assemblies may be fitted together in a glazed system forming a homogeneous unit relatively uniform to the naked eye (what is called "matchable" glazing). This relatively small change in property of the multilayer as a result of the heat treatment is characterized by a change in colorimetric response in reflection, $\Delta E$, of less than about 5 (where $\Delta E = (\Delta L^{*2} + \Delta a^{*2} + \Delta b^{*2})^{1/2}$) and a change $\Delta a^*$ of less than about 0.8.

Such glazing assemblies are provided with a multilayer comprising, starting from the glass, a silicon nitride layer, an essentially thin metal layer based on nickel or nickel alloy (1 to 2 nm in thickness), a silver layer, a thin essentially metallic layer (1-2 nm) based on nickel or nickel alloy, and a silicon nitride layer.

However, the relatively small change in colorimetric response is accompanied by an increase of at least 4% in the light transmission (change in light transmission $\Delta T_L \geq 4\%$, especially 5%) with in particular a $T_L$ initially within the 63 to 73% range, but after heat treatment within the 68 to 78% range. A change in light transmission of this order of magnitude is far from being an advantage from the standpoint of combining, side by side, an untreated glazing assembly with a thermally treated glazing assembly, since the difference in appearance between the two is clearly detectable by the naked eye.

Document WO 97/48649 also describes a multilayer of the above type that can be toughened, with two thin metal "blocking" layers, this time based on niobium, with a thickness of 0.7 to 2 nm.

When this glazing assembly is connected to a toughening heat treatment, the appearance of an intense uniform haze, and also corrosion spots, are observed.

These two prior solutions, which rely on the use of a metal "blocking" underlayer and overlayer, made from the same metal, therefore have significant drawbacks.

The object of the invention is to alleviate these drawbacks by seeking to improve the thin-film multilayers described above, especially by seeking to improve their behavior with regard to heat treatments of the bending and/or toughening type, in particular as regards optical changes and the appearance of optical defects.

The subject of the invention is a glazing assembly comprising at least one transparent substrate, especially made of glass, provided with a thin-film multilayer comprising, in the following order starting from the substrate, at least:
(a) a first dielectric layer;
(b) a lower stabilizing layer made of a metal or metal alloy X;
(c) a functional layer having reflection properties in the infrared and/or in the solar radiation, especially a metal layer;
(d) an upper metal blocking layer made of a metal or metal alloy Y;
(e) a second dielectric layer; and
(f) optionally, a protective oxide layer;

in which multilayer the metal or alloy X of the lower stabilizing layer is different from the metal or alloy Y of the upper blocking layer.

Although the prior art teaches, unambiguously, how to protect the functional layer by flanking it between two metal layers b and d of identical nature, the inventors of the present invention have demonstrated a very substantial improvement in the resistance to heat treatment as regards the optical properties of the glazing assembly when two different metals are chosen to form said layers b and d.

According to the present invention, it is considered that an alloy of two or more metals is a different material from each of the constituent metals in the pure state. However, it may be preferable for an alloy layer to contain only metals different from the associated second metal layer. Moreover, it will be considered that two alloys are different if they do not have the same quantitative or qualitative composition; however, it will be preferable for at least one metal to differ between these alloys, or even for each alloy to be based on different metals.

The improvement obtained according to the invention is a slight optical variation characterized by a change in light transmission $\Delta T_L$ of at most 3% and/or a change in the calorimetric response in external reflection $\Delta E^*$ between the case before heat treatment and the case after heat treatment of at most 3, with neither haze nor pitting.

The combination of good optical quality and of limited optical changes is obtained by the judicious choice of different metal layers. One explanatory hypothesis is based on the observation that the wetting of a metal drop A on a metal layer X will be different from the wetting of X on A. This effect is due to different surface energies in the case of A and X. It is therefore judicious to choose the metals X and Y so as to obtain the best wetting on either side of the silver (or other) functional layer so as to have the best adhesion and to obtain maximum protection during the heat treatment.

The first dielectric layer (a) comprises an oxygen diffusion barrier layer chosen from silicon nitrides, optionally containing at least one other metal, such as aluminum.

This dielectric layer essentially has the function of blocking the diffusion of oxygen into the multilayer, including at high temperature. Since nitrides are largely inert when exposed to an oxidizing attack, they undergo no appreciable structural modification or chemical modification (of the oxidative type) during a heat treatment of the toughening type, and therefore cause virtually no optical modification of the multilayer in the event of heat treatment, especially in terms of light transmission level. This layer may also act as a diffusion barrier preventing species from migrating from the glass, especially alkali metals. Furthermore, thanks to its refractive index of about 2, it is readily placed in a multilayer of the low-emissivity type.

This layer may generally be deposited with a thickness of at least 5 nm, especially at least 10 nm, for example between 15 and 70 nm, especially around 30 to 60 nm.

The lower metal layer (b) may be made of a metal X chosen from titanium, nickel, chromium, niobium, zirconium, tantalum, aluminum or a metal alloy containing at least one of these metals. Among such choices, a nickel chromium alloy proves to be particularly satisfactory.

Advantageously, the thickness of the layer (b) is chosen with a sufficient value for the metal layer to oxidize only partly during a heat treatment, such as the toughening treatment. Preferably, this thickness is less than or equal to 6 nm, between 1 and 6 nm and preferably at least 1.5 nm.

A lower metal chosen from metals that have a low affinity for oxygen makes it possible to limit the diffusion of residual oxygen through the silver layer and helps to prevent the appearance of defects of the haze or pitting type. Since the lower metal barely oxidizes at all during the heat treatment, its thickness is advantageously chosen in such a way that most of the light absorption by the multilayer is provided by this metal.

The functional layer (c) is typically a silver layer, but the invention applies in the same way to other layers of reflective metals, such as silver alloys, especially those containing titanium or palladium, or layers based on gold or copper. Its thickness is especially from 5 to 13 nm, preferably around 6 to 12 nm.

The upper metal layer (d) may be made of a metal Y chosen from titanium, nickel, chromium, niobium, zirconium, tantalum, aluminum and metal alloys containing at least one of these metals, different from the metal or alloy X of the layer (b). Advantageously, the metal Y is chosen from titanium, niobium, aluminum and zirconium; it is preferably titanium.

Advantageously, the thickness of the layer (d) is chosen with a value sufficient for the metal layer to oxidize only partly during a heat treatment, such as toughening. Preferably, this thickness is less than or equal to 6 nm, it may be as thin as about 0.4 nm and in particular lies within the range of around 0.4 to 4 nm.

An upper metal chosen from metals with a high affinity for oxygen furthermore makes it possible to block the diffusion of oxygen through the multilayer and therefore to provide effective protection of the functional silver layer. However, this oxidation of the upper metal causes a change in the light transmission $\Delta T_L$, and the maximum thickness of the upper metal layer (d) may be chosen so as to limit this change.

When the lower layer (b) is made of a barely oxidizable metal, such as nickel-chromium, and the upper layer (d) is made of a metal with a high affinity for oxygen, such as titanium, niobium or zirconium, the thickness of the lower metal layer (b) is advantageously chosen so as to be greater than that of the overlayer (d). Choosing the thicknesses of the metal layers in this way makes it possible to reduce the change in light transmission even more effectively.

Advantageously, the functional layer (c), typically made of silver, is in direct contact with the metal coatings (d) and (b) placed above and below it.

The second dielectric layer (e) has a function similar to that of the layer (a). It comprises an oxygen diffusion barrier layer chosen from silicon nitrides, optionally containing at least one other metal such as aluminum, etc.

This layer may generally be deposited with a thickness of at least 5 nm, especially at least 10 nm, for example between 15 and 70 nm, especially around 30 to 60 nm. It may in particular have a thickness greater than that of the first dielectric layer (a).

Advantageously, at least one (in particular each) of the dielectric coatings may comprise a layer based on one or more metal oxides. In particular, the upper dielectric layer (e) may comprise, on its outer surface, an oxide layer (f) that improves the scratch resistance of the multilayer.

It may be a layer based on zinc oxide or on a mixed oxide consisting of zinc and another metal (of the Al type). It may also be based on oxides comprising at least one of the following metals: Al, Ti, Sn, Zr, Nb, W, Ta. An example of a zinc-based mixed oxide which can be deposited as a thin film according to the invention is a mixed zinc tin oxide containing an additional element such as antimony, as described in WO 00/24686.

The thickness of this oxide layer may be from 0.5 to 6 nm.

One nonlimiting embodiment of the invention consists in providing a multilayer comprising, on glass, the following sequence:

... /silicon nitride/nickel chromium/Ag/titanium/silicon nitride/ ...
    (a)        (b)        (c)   (d)     (e)

the silicon nitride possibly containing another element, of the Al type, in a minor amount relative to Si.

In particular, the multilayer may comprise the double sequence (a)/(b)/(c)/(d)/(e)/(a')/(b')/(c')/(d')/(e'), where a' is identical to or different from a, and likewise in the case of b, b' c, c' d, d' and e, e', and in which the intermediate dielectric layers (e) and (a') may merge as a single layer of the same dielectric. This variant is illustrated by the multilayer, on glass: . . . /silicon nitride/nickel-chromium/silver/titanium/ silicon nitride/nickel-chromium/silver/titanium/silicon nitride.

As a variant, it is possible to associate with the silicon nitride layers, for example, an oxide layer ($SnO_2$, a mixed zinc tin oxide, etc.), reducing the thickness of the silicon nitride layer accordingly.

The multilayer configuration according to the invention makes it possible to eliminate essentially all the optical defects, especially defects of the haze or pitting type, on the thin-film multilayer after heat treatment.

The coated substrates according to the invention have, when they are fitted as a double-glazing unit with another substrate, a light transmission of between 40 and 70%, especially from 40 to 60%, and a selectivity of between 1.25 and 1.45, especially around 1.4 (the selectivity being the light transmission/solar factor ratio, where the solar factor is the ratio of the total energy entering a room through the glazing assembly to the incident solar energy according to the Parry Moon calculation for an air mass equal to 2).

They have a color in external reflection in the blue-green shades.

They may undergo heat treatments at a temperature of at least 100° C., especially about 130° C., for the purpose of assembling a laminated glass, or more than 500° C. for the purpose of bending, toughening or annealing in particular (even bending treatments that differ from one point on the substrate to another), while maintaining a high light absorption even after toughening. This small optical variation is characterized by a light transmission change $\Delta T_L$ (measured under illuminant $D_{65}$) between the case before bending and after bending of at most 3%, especially at most 2 to 2.5%, in particular at most 2%, and/or a change in colorimetric response in reflection $\Delta E^*$ between the case before bending and after bending of at most 3, especially at most 2.5, where $\Delta E^*$ is expressed, in the (L,a*,b*) colorimetry system, as follows: $\Delta E^* = (\Delta L^{*2} + \Delta a^{*2} + \Delta b^{*2})^{1/2}$.

The generally accepted criterion of toughenability in terms of change of calorimetric response in external reflection is that $\Delta E^*$ between the case before heat treatment and after heat treatment must be less than or equal to 2. However, it appears that a slightly higher value than 2 (but less than 3) is acceptable from the standpoint of the combined use of toughened and nontoughened volumes on one and the same curtain wall, if this change in calorimetric response is accompanied by a reasonable reduction in the level of reflection, preferably a change in absolute value limited to 2 ($|\Delta R_{ext}| \leq 2$), in particular a change of at most 1.5 ($|\Delta R_{ext}| \leq 1.5$).

Double glazing units thus formed also exhibit a small change in calorimetric response between normal incidence and non-normal incidence, both in the initial state and in the toughened state.

The coated substrate may be used as laminated glazing, it being possible for the multilayer to be placed beside the intermediate film within the laminated assembly on the side facing the outside of the space defined by the glazing assembly (face 2) or on the inside of the space defined by the glazing assembly (face 3). In such a glazing assembly at least one substrate may be toughened or hardened, especially the one bearing the multilayer. The coated substrate may also be combined with at least one other glass pane via a gas space in order to make an insulating multiple glazing (double glazing) unit. In this case, the multilayer preferably faces the intermediate gas space (face 2). A double glazing unit according to the invention may incorporate at least one laminated glass pane.

Advantageously, once the substrate has been provided with the thin-film multilayer, it undergoes a heat treatment at more than 500° C. in order to toughen it, with, after toughening, a color in external reflection characterized by a*<0 and b*<0.

The present invention also relates to a glazed unit incorporating several glazing assemblies according to the invention and especially to a glazed assembly incorporating at least one glazing assembly that has undergone a heat treatment and at least one glazing assembly that has not undergone heat treatment.

The invention will now be described in greater detail by means of the nonlimiting examples that follow.

In all the following examples, the layers are deposited by magnetically enhanced sputtering on a clear silica-soda-lime glass pane 4 mm in thickness of the PLANILUX type (glass sold by Saint-Gobain Glass).

The silicon-nitride-based layers are deposited from Al-doped Si targets in a nitriding atmosphere. The Ag-based layers are deposited from Ag targets in an inert atmosphere and the Ti-based layers from a Ti target, also in an inert atmosphere. The NiCr layers are deposited in an inert atmosphere from nickel-chromium alloy targets in portions of 80/20 by weight.

EXAMPLES 1 AND 2

These examples relate to a multilayer:

Glass/Al:$Si_3N_4$/NiCr/Ag/Ti/Al:$Si_3N_4$, where Al:$Si_3N_4$ means that the nitride contains aluminum.

Table 1 below repeats the multilayer, with the thicknesses indicated in nanometers for each of the two examples:

TABLE 1

| Glass | Example 1 | Example 2 |
|---|---|---|
| Al:$Si_3N_4$ | 37 nm | 37 nm |
| NiCr | 3.2 nm | 1.6 nm |
| Ag | 7 nm | 7 nm |
| Ti | 1.6 nm | 1.5 nm |
| Al:$Si_3N_4$ | 54 nm | 54 nm |

These coated glass assemblies were subjected to a toughening operation at above 600° C.

The overall optical quality of the glass after heat treatment was evaluated by observing if any defects, whether localized or not, of the pitting or haze type appeared. The glazing assembly was aluminated with an intense light coming, for example, from a halogen spot. A qualitative rating was assigned according to the following parameters:

| Defect | Rating |
|---|---|
| Uniform intense haze with pitting dispersed over the entire area | --- |
| Localized intense haze with pitting dispersed over the entire area or uniform intense haze without pitting | -- |
| Localized moderate haze with localized pitting or localized intense haze without pitting or pitting dispersed over the entire surface | - |
| Localized moderate haze or localized pitting | + |
| Light haze or very localized pitting | ++ |
| Neither haze nor pitting | +++ |

The change in appearance of the glass panes before and after the heat treatment was then evaluated by measuring the change in light transmission $\Delta T_L$ and the level of reflection as a percentage (averaged change; under illuminant $D_{65}$; standard observer at 2°) and the change in appearance $\Delta E^*$ (a unitless quantity, the formula for which was mentioned above) in external reflection, internal reflection and in transmission. These values, and the light transmission values $T_L$ (again under illuminant $D_{65}$ at 2°) in %, of external light reflection $R_{ext}$ and internal light reflection $R_{int}$, also in %, the values of l*, a* and b* in external reflection and internal reflection (a unitless quantities), the dominant wavelength and the purity in transmission, and also the solar factor SF (Parry Moon, mass 2) are given in Tables 2 and 3 below.

The optical changes were measured on double glazing units comprising a 6 mm thick substrate according to the invention, the substrate being separated by a 12 mm thick argon space, the multilayer-coated surface of the substrate according to the invention being turned toward the associated substrate.

The light transmission and reflections were measured using an integrating-sphere measurement apparatus that measures the light flux in all directions on one side of the substrate or on the other.

TABLE 2

| Ex. 1 | $T_L$ (%) | $\lambda_d$ (nm) | $p_e$ (%) | $R_{int}$ (%) | L* | a* | b* | $R_{ext}$ (%) | L* | a* | b* | SF (DIN) |
|---|---|---|---|---|---|---|---|---|---|---|---|---|
| before | 50.4 | 487 | 6.4 | 11.4 | 40.2 | 4.4 | 3.2 | 13.4 | 43.3 | -1.7 | -4.9 | 39 |
| after | 52.4 | 486 | 7.7 | 11.8 | 40.7 | 4.3 | 4.9 | 12.1 | 41.3 | -0.6 | -3.8 | 39 |
| Δ | $\Delta T_L = 2, \Delta E^* = 1.7$ | | | $\Delta R_{int} = 0.4, \Delta E^* = 1.8$ | | | | $\Delta R_{ext} = -1.3, \Delta E^* = 2.6$ | | | | |

TABLE 3

| Ex. 2 | $T_L$ (%) | $\lambda_d$ (nm) | $p_e$ (%) | $R_{int}$ (%) | L* | a* | b* | $R_{ext}$ (%) | L* | a* | b* | SF (DIN) |
|---|---|---|---|---|---|---|---|---|---|---|---|---|
| before | 59.2 | 489 | 4.6 | 11.2 | 39.8 | 2.31 | 1.99 | 11.0 | 39.59 | -1.49 | -5.04 | 47 |
| after | 61.2 | 487 | 5.5 | 11.3 | 40.1 | 1.59 | 3.15 | 10.4 | 38.6 | -0.64 | -4.71 | 47 |
| Δ | $\Delta T_L = 2, \Delta E^* = 1.5$ | | | $\Delta R_{int} = 0.1, \Delta E^* = 1.4$ | | | | $\Delta R_{ext} = -0.6, \Delta E^* = 1.4$ | | | | | before = before toughening
after = after toughening
Δ = optical changes

The multilayer according to Examples 1 and 2 after toughening exhibits very good optical quality with no haze or corrosion pitting, receiving the rating +++.

The calorimetric behavior of the glazing assembly demonstrates a relatively small change with regard to the angle of incidence, as indicated in Table 4 below which presents the change in appearance in external reflection for various angles of incidence, this change being calculated between toughened and nontoughened glazing assemblies.

TABLE 4

| | Angle of incidence | | | | |
|---|---|---|---|---|---|
| | 0° | 30° | 45° | 60° | 75° |
| $\Delta E^* (R_{ext})$ | 2.6 | 2.2 | 2.1 | 1.5 | 0.8 |

Moreover, a* and b* vary only slightly with the angle of incidence, and also in the direction of limiting the change in appearance when the observer moves away from normal incidence, so that the toughenability criteria are even better satisfied. This is an appreciable advantage, especially for the production of large glazed units for which it is desirable to see the same color at all angles of observation.

COMPARATIVE EXAMPLE 1

This is a multilayer according to document WO 01/40131 in which the two metal blocking layers are made of nickel chromium. It is identical to Example 1, except that the Ti layer (d) is replaced with an NiCr layer 1.2 nm in thickness.

When it undergoes a toughening heat treatment such as that carried out on the previous examples, this multilayer manifests a light transmission change of greater than 4%, being around 5%, which is more than twice as large as the observed change with the invention.

COMPARATIVE EXAMPLE 2

This is a multilayer similar to that of Comparative Example 1, in which both metal layers (b) and (d) are made of titanium.

This multilayer demonstrates, after heating, an intense uniform haze and a few corrosion pits, penalized by the − − − rating.

The change in light transmission measured using an integrating sphere is acceptable, but it drops considerably when it is measured in the direction of incidence, owing to the strong scattering that gives the haze effect.

EXAMPLE 3

This example according to the invention differs from Example 1 by the fact that the metal layers (b) and (d) are inverted, thus the titanium layer becomes the lower layer and the nickel-chromium layer becomes the upper layer.

When this multilayer undergoes a toughening heat treatment, it results in the following optical changes:

The toughened multilayer has an acceptable optical quality, but exhibits a light haze, awarded the ++ rating.

Comparing this example with Example 1 shows that it is preferable to place the metal with a low affinity for oxygen as the lower layer and the metal with a high affinity for oxygen as the upper layer.

EXAMPLE 4

This example according to the invention differs from Example 1 by the fact that the metal layer (d) is this time made of niobium with a thickness of 1.5 nm.

The multilayer is the following:

Glass/Si$_3$N$_4$(37)/NiCr(3.2)/Ag(7)/Nb(1.5)/Si$_3$N$_4$(54)

The optical changes are given in Table 6 below.

TABLE 6

| Ex. 4 | $T_L$ (%) | $\lambda_d$ (nm) | $p_e$ (%) | $R_{int}$ (%) | L* | a* | b* | $R_{ext}$ (%) | L* | a* | b* | SF (DIN) |
|---|---|---|---|---|---|---|---|---|---|---|---|---|
| before | 51.5 | 493 | 3.8 | 10.2 | 38.0 | 5.3 | −7.4 | 16.5 | 47.5 | −2.91 | −4.63 | 39 |
| after | 50.9 | 487 | 6.9 | 10.6 | 38.8 | 5.1 | −2.7 | 15.7 | 46.5 | −1.97 | −2.77 | 38 |
| Δ | $\Delta T_L = -0.6$, $\Delta E^* = 3.1$ | | | $\Delta R_{int} = 0.4, \Delta E^* = 4.8$ | | | | $\Delta R_{ext} = -0.8, \Delta E^* = 1.8$ | | | | |

This multilayer demonstrates, after heating, a very good optical quality without any haze or corrosion pits, receiving the +++ rating.

COMPARATIVE EXAMPLE 3

This is a multilayer according to document WO 97/48649 in which the two metal blocking layers are made of niobium. It is identical to Example 1 except that the layers (b) and (d) are made of Nb with a thickness of between 0.7 and 2 nm.

After heating, this multilayer demonstrates an intense uniform haze and several corrosion pits, penalized by the − − − rating.

The change in light transmission measured using an integrating sphere is acceptable, but drops considerably when it is measured in the direction of incidence, owing to the strong scattering that gives the haze effect.

These examples show that by choosing two metal layers made of different metals, a very considerable improvement is made over a multilayer using the same metal or alloy, even with different thicknesses, on either side of the silver.

These examples must not be regarded as describing the invention in a limiting manner, the invention also applies to multilayers using another functional layer, and also several functional layers.

Of course, a person skilled in the art is capable of producing different embodiments of the invention without thereby departing from the scope of the patent as defined by the claims.

TABLE 5

| Ex. 3 | $T_L$ (%) | $\lambda_d$ (nm) | $p_e$ (%) | $R_{int}$ (%) | L* | A* | b* | $R_{ext}$ (%) | L* | a* | b* | SF (DIN) |
|---|---|---|---|---|---|---|---|---|---|---|---|---|
| before | 53.1 | 518 | 2.1 | 10.7 | 38.9 | 7.8 | −6.2 | 14.5 | 44.9 | −1.3 | −5.0 | 41 |
| after | 52.9 | 491 | 4.9 | 11.1 | 39.7 | 5.1 | 0.4 | 14.2 | 44.4 | −2.4 | −3.6 | 40 |
| Δ | $\Delta T_L = -0.2$, $\Delta E^* = 4.7$ | | | $\Delta R_{int} = 0.2, \Delta E^* = 7.2$ | | | | $\Delta R_{ext} = -0.3, \Delta E^* = 1.8$ | | | | |

The invention claimed is:

1. A glazing assembly comprising at least one transparent substrate, provided with a thin-film multilayer comprising, in the following order starting from the substrate:
    (a) a first dielectric layer comprising a barrier layer acting as a barrier to the diffusion of oxygen and comprising silicon nitrides;
    (b) a lower stabilizing layer made of at least one metal or metal alloy X selected from the group consisting of titanium, nickel, chromium, niobium, zirconium, tantalum, aluminum or a metal alloy containing at least one of these metals;
    (c) a functional layer having reflection properties in the infrared and/or in the solar radiation;
    (d) an upper metal blocking layer made of at least one metal or metal alloy Y selected from the group consisting of titanium, nickel, chromium, niobium, zirconium, tantalum, aluminum or a metal alloy containing at least one of these metals;
    (e) a second dielectric layer comprising a barrier layer acting as a barrier to the diffusion of oxygen and chosen from silicon nitrides; and
    (f) optionally, a protective oxide layer; in which multilayer the metal or alloy X of the lower stabilizing layer is different from the metal or alloy Y of the upper blocking layer.

2. The glazing assembly as claimed in claim 1, wherein the thickness of the dielectric layer (a) and (e), respectively, is at least 5 nm.

3. The glazing assembly as claimed in claim 1, wherein the stabilizing lower metal layer (b) comprises a nickel-chromium alloy.

4. The glazing assembly as claimed in claim 1, wherein the thickness of the layer (b) is between 1 and 6 nm.

5. The glazing assembly as claimed in claim 1, wherein the layer (c) is a metal layer based on silver, titanium, palladium or gold.

6. The glazing assembly as claimed in claim 5, wherein the layer (c) has a thickness of 6 to 12 nm.

7. The glazing assembly as claimed in claim 1, wherein the upper metal blocking layer (d) is made of a metal Y chosen from titanium, zirconium, niobium and aluminum.

8. The glazing assembly as claimed claim 1, wherein the thickness of the layer (d) is less than 6 nm.

9. The glazing assembly as claimed in claim 1, wherein the thickness of the layer (b) is greater than that of the layer (d).

10. The glazing assembly as claimed in claim 1, wherein at least one of the dielectric further comprises a layer based on one or more metal oxides.

11. The glazing assembly as claimed in claim 1, which comprises an outer layer (f) based on an oxide of at least one metal chosen from Zn, Al, Ti, Sn, Zr, Nb, W, and Ta.

12. The glazing assembly as claimed in claim 1, wherein the substrate comprises glass.

13. The glazing assembly as claimed in claim 12, which comprises in the following order starting from the substrate /silicon nitride/nickel-chromium/Ag/titanium/silicon nitride/nickel-chromium/Ag/titanium/silicon nitride/.

14. The glazing assembly as claimed in claim 1, which is mounted with another substrate as a double glazing assembly to form a unit and the unit has a light transmission of between 40 and 70%.

15. The glazing assembly as claimed in claim 1, which has a selectivity defined by a ratio of light transmission to solar factor, , $T_L/SF$ of between 1.25 and 1.45.

16. The glazing assembly as claimed in claim 1, which has a blue-green color in reflection.

17. The glazing assembly as claimed in claim 1, which undergoes a heat treatment at more than 500° C. after the multilayer is provided to the substrate, with an average light transmission change $\Delta T_L$ induced by the heat treatment of at most 3% and/or an average change in calorimetric response in reflection induced by the heat treatment $\Delta E^*$ of at most 3.

18. A glazed unit comprising at least two glazing assemblies as claimed in claim 1.

19. The glazed unit as claimed in claim 18, wherein at least one glazing assembly has undergone a heat treatment and at least one glazing assembly has not undergone heat treatment.

20. The glazing assembly as claimed in claim 1, wherein the thickness of the dielectric layer (a) and (e), respectively, is between 15 and 70 nm.

21. The glazing assembly as claimed in claim 1, which undergoes a heat treatment at more than 500° C. after the multilayer is provided to the substrate-with an average light transmission change $\Delta T_L$ induced by the heat treatment of around 2% and/or an average change in calorimetric response in reflection induced by the heat treatment $\Delta E^*$ of at most 2.5.

* * * * *